United States Patent [19]

Gu

[11] Patent Number: 6,002,386

[45] Date of Patent: Dec. 14, 1999

[54] AUTOMATIC CONTRAST CONTROL OF DISPLAY DEVICE

[75] Inventor: Sung-Jin Gu, Kyungki-do, Rep. of Korea

[73] Assignee: SamSung Electronics Co., Ltd., Kyungki-do, Rep. of Korea

[21] Appl. No.: 08/966,537

[22] Filed: Nov. 10, 1997

[30] Foreign Application Priority Data

Nov. 8, 1996 [KR] Rep. of Korea ............. 96-52925

[51] Int. Cl.$^6$ .......................... G09G 5/10; H04N 5/52
[52] U.S. Cl. ................ 345/147; 345/112; 348/678
[58] Field of Search ................ 345/6, 112, 127, 345/147; 348/647, 648

[56] References Cited

U.S. PATENT DOCUMENTS

| | | | |
|---|---|---|---|
| 5,384,593 | 1/1995 | Gell, Jr. et al. ............. | 345/112 |
| 5,457,473 | 10/1995 | Arai et al. . | |
| 5,488,434 | 1/1996 | Jung . | |
| 5,515,069 | 5/1996 | Dillon III ............. | 345/6 |
| 5,526,058 | 6/1996 | Sano et al. ............. | 348/647 |
| 5,532,719 | 7/1996 | Kikinis . | |
| 5,550,556 | 8/1996 | Wu et al. . | |
| 5,576,732 | 11/1996 | Minakuchi et al. .......... | 345/127 |
| 5,635,951 | 6/1997 | Takahashi ............. | 345/127 |
| 5,889,506 | 3/1999 | Lopresti et al. ............. | 345/158 |

FOREIGN PATENT DOCUMENTS

| | | | |
|---|---|---|---|
| 1-277286 | 11/1989 | Japan ............. | G09G 1/00 |
| 3-189683 | 8/1991 | Japan ............. | G09G 1/00 |
| 04070899 | 5/1992 | Japan ............. | G09G 5/00 |

Primary Examiner—Amare Mengistu
Assistant Examiner—David L Lewis
Attorney, Agent, or Firm—Robert E. Bushnell, Esq.

[57] ABSTRACT

An automatic contrast control circuit for a display device includes a distance detector installed on a front panel of the display device, for detecting a distance existing between a user and the front panel and generating a distance signal representative of the detected distance; and a microcomputer for outputting a contrast gain control signal based on the distance signal output from the distance detector, and outputting on screen display (OSD) data indicative the contrast gain signal. A display control panel is provided on the display device to permit user input of an automatic contrast control (ACL) function and an OSD function. The distance detector includes a light emitting unit for emitting light from the display device, and a light receiving unit for receiving the light reflected from the user to detect the distance between the user and the front panel of the display device. Thus, The contrast of the display device is controlled automatically, depending on the proximity of the user to the display screen, to offer enhanced eye protection.

2 Claims, 3 Drawing Sheets

_6,002,386_

AUTOMATIC CONTRAST CONTROL OF DISPLAY DEVICE

CLAIM OF PRIORITY

This application makes reference to, incorporates the same herein, and claims all benefits accruing under 35 U.S.C. §119 from an application entitled AUTOMATIC CONTRAST CONTROL OF DISPLAY DEVICE earlier filed in the Korean Industrial Property Office on the of Nov. 8, 1996, and there duly assigned Serial No. 96-52925 by that Office.

BACKGROUND OF THE INVENTION

1. Technical Field

The present invention relates to a display device for a computer system, and more particularly, to an automatic contrast control mechanism for a display device using a detected distance between a user and the front panel of the display device to control the display contrast automatically.

2. Background Art

Conventional display device, both color and monochrome, typically has built-in control inputs for user adjustments of display parameters such as contrast, brightness, picture position including horizontal and vertical positioning, size, tint, color balance, focus, inter alia. Multi frequency display device includes several control inputs which increase the number of combinations of adjustments that a user can made. These control inputs may be remotely controlled or mounted at different locations of the display device where the user may open to access the controls as determined by each manufacturer.

For cathode-ray tube (CRT) device, the control inputs for contrast and brightness typically interact with video circuitry in the display device, and modulate the signal by varying electrical potential that effect the formation of an on-screen image. The brightness control, for example, adjusts the level of the scanning electron beam, which in turn makes the on-screen image brighter or less bright. Contrast is the linear relationship between incoming video dot data signal strength and the current screen brightness. In addition to brightness and contrast control inputs, there are also control inputs for position and sizing, which allow the user to alter the position of the display on the screen and to adjust the height and width of the display area on the screen. Exemplars of contemporary display device with control inputs are disclosed in U.S. Pat. No. 5,550,556 for Transmitting Data And Commands To Display Monitors issued to Wu et al., U.S. Pat. No. 5,532,719 for Remote Control Of Display Functions issued to Kikinis, U.S. Pat. No. 5,488,434 for Picture Adjusting Method Of A Color Television And Its Circuit issued to Jung, and U.S. Pat. No. 5,457,473 for Image Display Apparatus issued to Arai et al. When the control inputs such as picture contrast or brightness are executed, however, the picture contrast or brightness levels are fixed until further adjustments are manually requested by the user.

Contemporary display device with such control inputs, as I have observed, seldom takes into account the user's close proximity to the display screen and the duration of such a proximity. Consequently, if the user spends long hours in close proximity of such display device, particularly in CAD/CAM applications, there is no mechanism provided to alleviate the user's eye strain.

SUMMARY OF THE INVENTION

It is therefore an object of the present invention to provide a display device capable of automatically controlling contrast of an image to provide enhanced eye protection for users.

It is also an object to provide a display device capable of automatically controlling contrast of an image in accordance with the user's proximity to the display device.

It is another object to provide a display device having an automatic contrast control circuit incorporated therein for detecting a distance of the user from the display device and automatically controlling the contrast of an image in accordance with the detected distance.

It is yet another object to provide a method for automatically controlling the contrast of a display device in accordance with the distance of the user from the display device.

These and other objects of the present invention can be achieved by an automatic contrast control circuit for a display device which comprises a distance detector installed on a front panel of the display device, for detecting a distance of a user from the front panel of the display device and generating a distance signal indicative of the detected distance; and a micro-computer for generating a contrast gain control signal in accordance with the detection signal and generating on-screen display (OSD) data indicative the contrast gain control signal.

In accordance with another aspect of the present invention, a method for automatic contrast control of a display device using a distance detector installed on the front panel of the device comprises the steps of: (a) detecting a distance between the user and the front panel of the display device; (b) determining whether the detected distance is less than a reference distance; and (c) generating a contrast gain control signal indicative of the detected distance, when the distance detected is less than the reference distance, and automatically controlling the contrast of the display device.

The present invention is more specifically described in the following paragraphs by reference to the drawings attached only by way of example.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
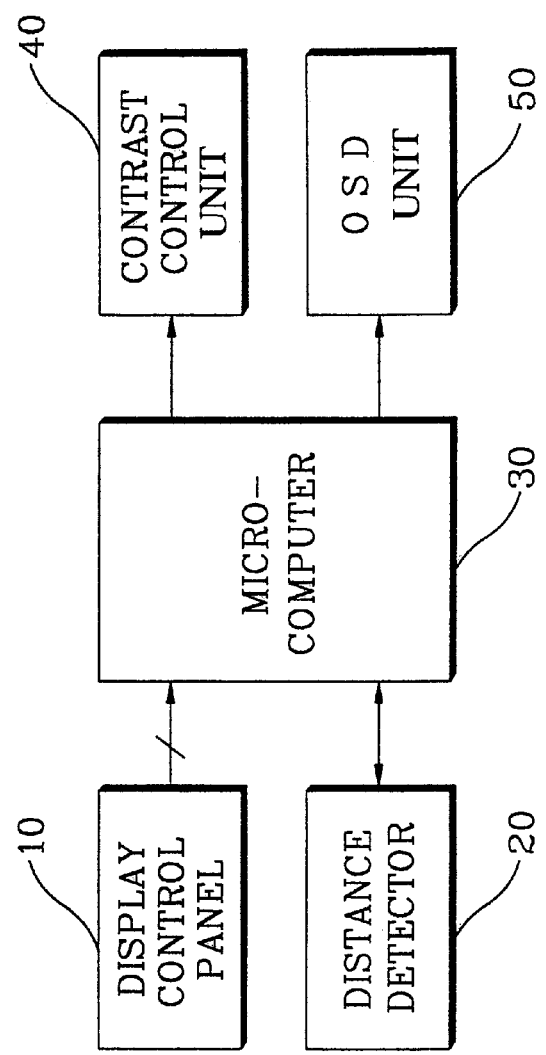
FIG. 1 is a block diagram of an automatic contrast control circuit of a display device constructed according to the principles of the present invention.

Referring now to the drawings, and in particular to FIG. 1 which illustrates an automatic contrast control circuit of a display device such as a CRT monitor as constructed according to the principles of the present invention. The automatic contrast control circuit comprises a display control panel 10 installed on the display device, a distance detector installed on the display device, a micro-computer 30, a contrast control unit 40 and an OSD unit 50 installed inside the display device.

The display control panel 10 which allows the user to select an automatic contrast control (ACL) function and an on-screen display (OSD) function, generates a first function selection signal in response to input of the ACL function, and a second function selection signal in response to input of the OSD function. The distance detector 20, which is installed in a front panel of the display device and activated by the first function selection signal, detects a distance existing between a user and the front panel of the display device and generates a distance signal representative of the detected distance. The micro-computer 30 receives the outputs of the display control panel 10 and distance detector 20 in order to determine the detected distance and generate a contrast gain signal and an OSD signal relating to the contrast gain signal. The contrast control circuit 40 limits the contrast of an image on a display screen in accordance with the contrast gain signal generated from the micro-computer 30. The on-screen display (OSD) unit 50 for processing the OSD signal generated from the micro-computer 30.

Figure 2:
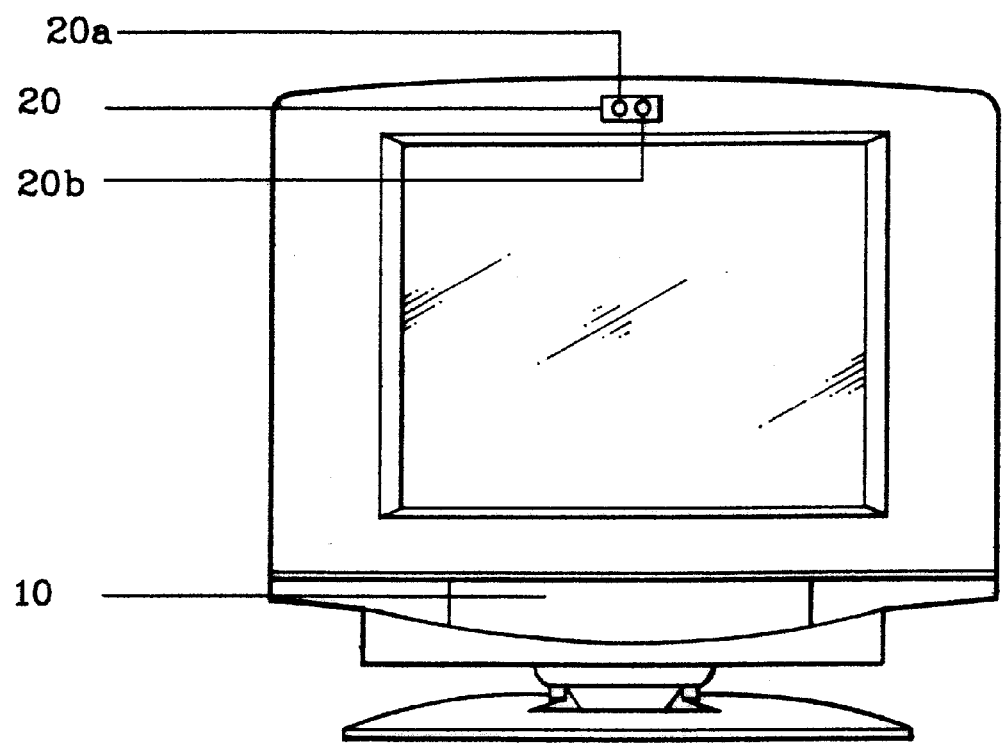
FIG. 2 illustrates an exemplary display device having an automatic contrast control circuit constructed according to the principles of the present invention.

FIG. 2 illustrates an exemplary display device having an automatic contrast control circuit incorporated therein. As shown in FIG. 2, the display control panel 10 is provided generally below the display screen for allowing the user to activate the ACL function for automatically controlling the contrast of an image on the display screen. The distance detector 20 is provided on the display screen and includes a light emitting unit 20a for emitting light intermittently (at a predetermined time period), and a light receiving unit 20b for receiving the light emitted from light emitting unit and reflected from the user to determine the distance of the user from the front panel of the display device.

The operation of the automatic contrast control circuit of a display device constructed according to the principles of the present invention will now be described in detail with reference to FIGS. 1 to 3 herein below.

When the ACL function is selected by the user via the display control panel 10 and the user is neared the front panel of the display device, the distance detector 20 is activated and thus detects the proximity of the user, i.e., the distance between the user's face and the display screen. The distance detector 20 then outputs a distance signal to micro-computer 30 which in turn, according to the detected distance, generates a contrast gain signal for output to tho contrast control circuit 40. For example, when the detected distance is within, say, 30 cm and the contrast gain signal ranges over 0.5–2.0V, the contrast control circuit 40 applies a 0.1V/cm voltage change to each of the red, green and blue video signal.

When the OSD function is selected by the user via the display control panel, OSD data is generated for a visual display so that the user may confirm automatic contrast control and other information indicative of the detected distance. In this situation, the OSD unit 50 receives output data from the micro-computer 30 according to the controlled contrast gain signal, and processes the same to generate an OSD gain signal. Both the ACL function and the OSD function are provided at the display control panel 10 located generally below the display screen of the display device as shown in FIG. 2 for activating the distance detector 20 to detect the proximity of the user from the display device and automatically controlling the contrast of an image in accordance with the proximity of the user from the display device.

Figure 3:
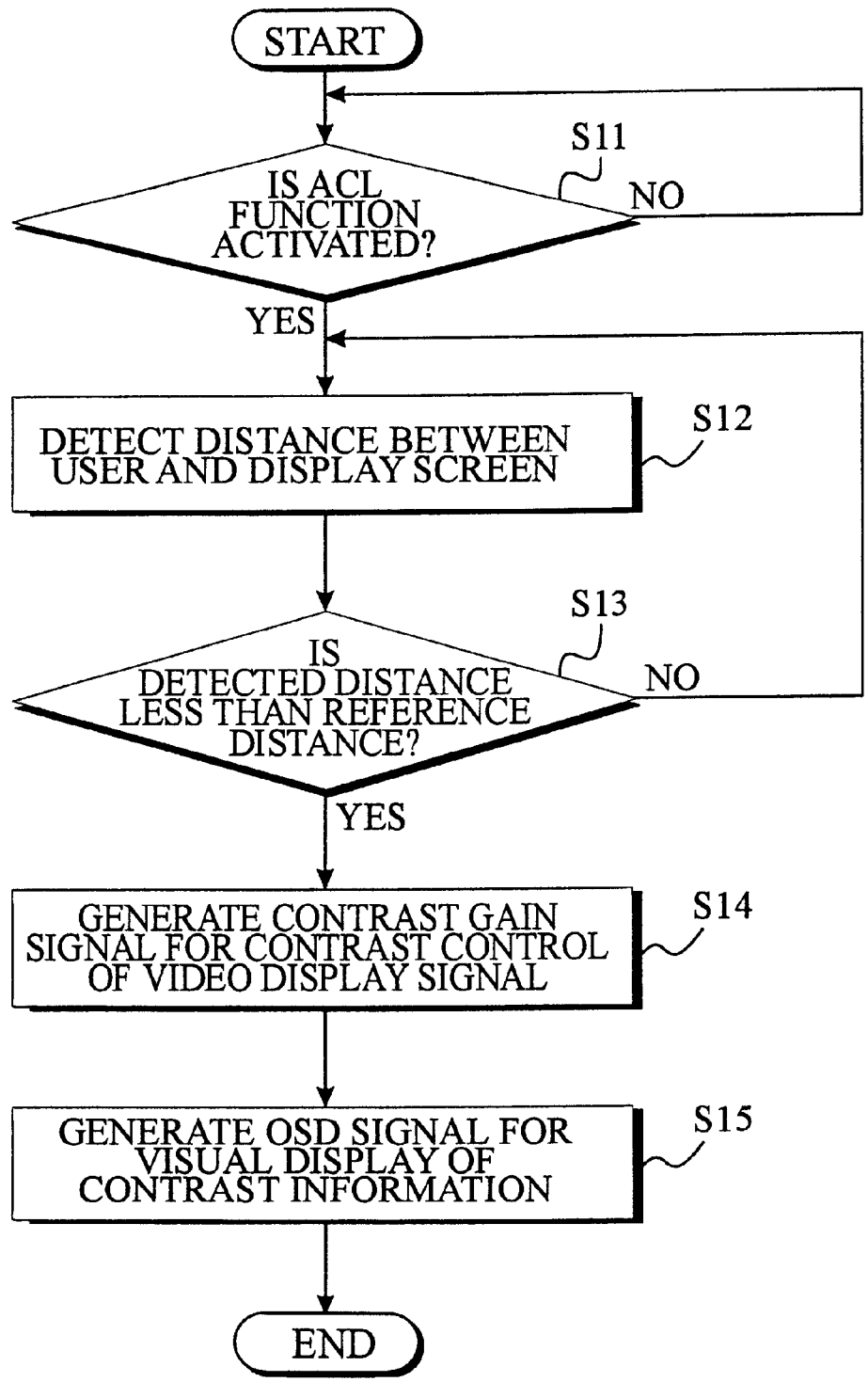
FIG. 3 illustrates an automatic contrast control process according to the principles of the present invention.

Referring to FIG. 3, an automatic contrast control method using the automatic contrast control circuit according to the present invention includes: a step S11 for determining whether the ACL function is activated; step S12 for detecting a distance existing between the user and the front panel of the display device; step S13 for determining whether the detected distance is less than a reference distance; step S14 for generating a contrast gain signal for automatically controlling contrast of an image according to the detected distance; and step S15 for generating an OSD signal so as to provide a visual display of contrast information when the user selects the OSD function.

In more detail, when extra long hours working with the display device on specific design applications such as CAD/CAM applications are necessary, and the visual protection provided by contrast control is needed, the user needs to activate the ACL function via the display control panel 10. When the ACL function is activated at step S11, the distance detector 20 is also activated to transmit light via the light emitting unit 20a and receive the reflected light via the light receiving unit 20b in order to determine the distance between the user and display screen at step S12. After the distance between the user and the display screen is determined, the micro-computer 30 determines whether the detected distance between the user and the display screen is within an operational range set by a reference distance, for example, 30 cm at step S13. Only after the detected distance between the user and the display screen is determined within the operational range set by the reference distance, that is, less than the reference distance, the micro-computer 30 generates a contrast gain signal for contrast control of the video display signal at step S14. At the same time, the OSD unit 50 also generates an OSD signal for visual display of contrast information on the display screen at step S15, if the user selects the OSD function provided at the display control panel 10. It is noted that the distance between the user and the display screen is continuously monitored until the user is within the set operational range of 30 cm, that is, when the detected distance is less than the reference distance. After the contrast gain signal for contrast control of a video display signal is generated from the micro-computer 30, the contrast control circuit 40 controls the contrast of an image on the display screen, and the corresponding OSD information is displayed on the OSD section of the display screen.

As described above, the present invention automatically controls the contrast of a display device in accordance with the user's proximity to the front panel of the display device in order to provide enhanced visual protection to users.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An automatic contrast control circuit for a display device, comprising:

a distance detector, installed on a front panel of the display device, for detecting a distance between a user and the front panel of the display device and generating a distance signal indicative of the detected distance between the user and the front panel;

a controller for generating a contrast gain control signal to automatically control contrast of an image provided on the display device in accordance with the distance signal, and generating on-screen display data indicative the contrast gain control signal;

a first function selection means for enabling an automatic contrast control function, and generating a signal representative of the selected function for output to said controller to activate operation of said distance detector and generation of said contrast gain control signal; and a second function selection means for enabling an on-screen display function, and generating a signal representative of the selected function for output to said controller to activate an on-screen display of the contrast gain control signal.

2. A method for automatic contract control of a display device using a distance detector installed on a front panel of the display device, said method comprising the steps of:

detecting a distance existing between a user and the front panel of the display device;

determining whether a detected distance is less than a reference distance, said reference distance corresponding to thirty (30)cm; and generating a contrast gain control signal reflective of the detected distance, when the detected distance is less than the reference distance, and automatically controlling the contrast of an image on the display device, and activating an on screen display of the contrast gain control signal.

* * * * *